US010989041B2

(12) United States Patent
Cromar et al.

(10) Patent No.: US 10,989,041 B2
(45) Date of Patent: Apr. 27, 2021

(54) LOGGING WITH SELECTIVE SOLIDIFICATION OF ANNULAR MATERIAL

(71) Applicant: CONOCOPHILLIPS COMPANY, Houston, TX (US)

(72) Inventors: Stephen Cromar, Aberdeen (GB); Ian Milne, Aberdeen (GB)

(73) Assignee: CONOCOPHILLIPS COMPANY, Houston, TX (US)

( * ) Notice: Subject to any disclaimer, the term of this patent is extended or adjusted under 35 U.S.C. 154(b) by 44 days.

(21) Appl. No.: 15/952,499

(22) Filed: Apr. 13, 2018

(65) Prior Publication Data

US 2018/0313201 A1  Nov. 1, 2018

Related U.S. Application Data

(60) Provisional application No. 62/492,510, filed on May 1, 2017.

(51) Int. Cl.
*E21B 47/00* (2012.01)
*E21B 47/005* (2012.01)
(Continued)

(52) U.S. Cl.
CPC .............. *E21B 47/005* (2020.05); *G01V 1/22* (2013.01); *G01V 1/52* (2013.01); *E21B 33/14* (2013.01); *G01V 99/00* (2013.01)

(58) Field of Classification Search
CPC ..... E21B 47/0005; E21B 47/005; G01V 1/22; G01V 1/52; G01V 99/00
See application file for complete search history.

(56) References Cited

U.S. PATENT DOCUMENTS 4,255,798 A * 3/1981 Havira ................ E21B 47/0005
181/105
5,874,676 A * 2/1999 Maki, Jr. ............. E21B 47/0005
181/105
(Continued)

FOREIGN PATENT DOCUMENTS

WO    20160039719 A1   3/2016

OTHER PUBLICATIONS

International Search Report, PCT/US2018/027487 dated Jun. 25, 2018; 2 pgs.
(Continued)

*Primary Examiner* — John Fitzgerald
(74) *Attorney, Agent, or Firm* — ConocoPhillips Company

(57) ABSTRACT

Systems and methods of logging in a well include utilizing a solidifying fluid, such as magnetorheological fluid, in at least one annulus surrounding a logging tool. Given production tubing may remain in the well during the logging as desired for efficiency, space between the production tubing and a casing string may form the annulus. Filling the annulus with the solidifying fluid and selective activation of the solidifying fluid to a solidified state during the logging limits interference in data collected as a result of transmitting across the annulus. Deactivation of the solidifying fluid to a liquefied state enables recovery of the solidifying fluid from the well after the logging. Embodiments employ the logging in various applications, such as assessing a cemented casing string in well abandonment operations.

20 Claims, 5 Drawing Sheets

(51) Int. Cl.
*G01V 1/22* (2006.01)
*G01V 1/52* (2006.01)
*E21B 33/14* (2006.01)
*G01V 99/00* (2009.01)

(56) References Cited

U.S. PATENT DOCUMENTS

| | | | | |
|---|---|---|---|---|
| 6,959,773 | B2* | 11/2005 | Mese | C09K 8/32 |
| | | | | 175/65 |
| 7,334,639 | B2* | 2/2008 | Svoboda | C04B 28/02 |
| | | | | 166/294 |
| 8,188,014 | B2* | 5/2012 | Svoboda | E21B 33/14 |
| | | | | 507/241 |
| 9,206,659 | B2* | 12/2015 | Zhang | C09K 8/70 |
| 10,808,495 | B2* | 10/2020 | Gano | E21B 33/13 |
| 2004/0094331 | A1* | 5/2004 | Mese | C09K 8/32 |
| | | | | 175/65 |
| 2005/0109540 | A1* | 5/2005 | Zitha | E21B 21/003 |
| | | | | 175/65 |
| 2007/0070816 | A1 | 3/2007 | Hurst et al. | |
| 2011/0186297 | A1* | 8/2011 | Zhang | C09K 8/70 |
| | | | | 166/308.1 |
| 2011/0272141 | A1 | 11/2011 | Lewis et al. | |
| 2014/0224480 | A1* | 8/2014 | Nguyen | C09K 8/80 |
| | | | | 166/247 |
| 2014/0262268 | A1 | 9/2014 | Kageler | |
| 2015/0315868 | A1* | 11/2015 | Fripp | E21B 33/1208 |
| | | | | 166/387 |
| 2015/0345250 | A1* | 12/2015 | Murphree | E21B 43/25 |
| | | | | 166/292 |
| 2016/0010424 | A1* | 1/2016 | van Oort | C04B 28/02 |
| | | | | 166/293 |
| 2016/0033664 | A1* | 2/2016 | Cheng | E21B 47/00 |
| | | | | 73/152.57 |
| 2016/0160119 | A1* | 6/2016 | Cannan | C09K 8/70 |
| | | | | 166/280.2 |
| 2016/0334540 | A1* | 11/2016 | Quintero | G01V 5/08 |
| 2017/0191341 | A1* | 7/2017 | Fripp | E21B 23/06 |
| 2017/0268312 | A1* | 9/2017 | Haake | C09K 8/50 |
| 2020/0032614 | A1* | 1/2020 | Usher | E21B 33/134 |

OTHER PUBLICATIONS

Wu, Qian—"Magnetorheological Fluids for Oil and Gas Well Application", May 2015, University of Texas at Austin, University of Texas Libraries Electronic Theses and Dissertations; 66 pgs.
BASF, Carbonyl Iron Power, BASF the Chemical Company, Mar. 2012; 7 pgs.

* cited by examiner

LOGGING WITH SELECTIVE SOLIDIFICATION OF ANNULAR MATERIAL

CROSS-REFERENCE TO RELATED APPLICATIONS

This application is a non-provisional application which claims benefit under 35 USC § 119(e) to U.S. Provisional Application Ser. No. 62/492,510 filed May 1, 2017, entitled "LOGGING WITH SELECTIVE SOLIDIFICATION OF ANNULAR MATERIAL" which is incorporated herein in its entirety.

FIELD OF THE INVENTION

Embodiments of the invention relate to systems and methods utilizing selective solidification of annular material, such as a magnetorheological fluid, for well logging.

BACKGROUND OF THE INVENTION

Well logging creates a record (a well log) of geologic formations penetrated by a borehole or of certain characteristics of a well and well conditions. Annular areas in the well surrounding tools lowered into the borehole to produce such well logs can create problems with measurements taken by these tools. In particular, the tools often rely on transmission of logging waves, such as sonic waves, through the annulus, which can interfere with the measurements when filled with fluids in a liquid or gas phase.

Logging can occur during any phase of a well's history, such as drilling, completing, producing, or abandoning. In an example regarding well abandonment, the well often needs to be logged to review the existing cement behind the casing string of the well before beginning abandonment operations. Time consuming and expensive removal of the production string provides one option used in the past to mitigate the interference caused by liquid in the annulus between the production tubing and the casing string.

Therefore, a need exists for systems and methods utilizing selective solidification of annular material, such as a magnetorheological fluid, for well logging.

BRIEF SUMMARY OF THE DISCLOSURE

In one embodiment, a system for logging a well includes a magnetorheological fluid injected into an annulus of the well. The system also includes a logging tool disposed in the well along a length of the annulus filled with the magnetorheological fluid. An electromagnet, as configured and disposed in the well proximate the logging tool, activates the magnetorheological fluid to an on-state during operation of the logging tool.

According to one embodiment, a method of logging in a well includes injecting a solidifying fluid while in a liquefied state into an annulus of a well. Further, the method includes operating a logging tool disposed in the well along a length of the annulus filled with the solidifying fluid. Activating the solidifying fluid to a solidified state occurs during the operating of the logging tool.

For one embodiment, a method of assessing cement quality surrounding casing of a well includes injecting a magnetorheological fluid in an off-state into an annulus between production tubing and the casing. Applying a magnetic field with an electromagnet activates the magnetorheological fluid in the annulus to an on-state while logging the cement quality by transmitting from a logging tool through the magnetorheological fluid in the on-state to the cement. Deactivation of the electromagnet to return the magnetorheological fluid to the off-state enables recovering the magnetorheological fluid from the well.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION OF THE DISCLOSURE

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
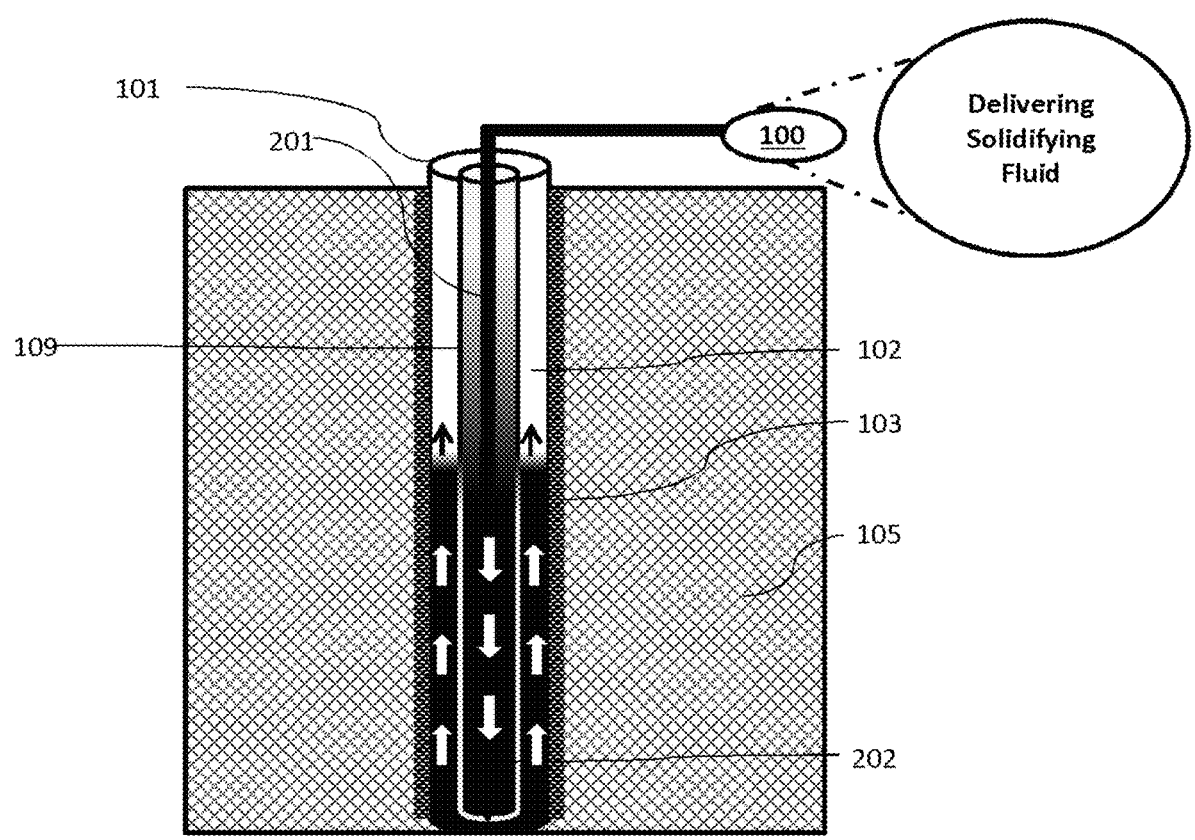
FIG. 1 depicts a cross-sectional schematic of a well annulus being filled with liquid-state annular material, or solidifying fluid.

FIG. 1 illustrates an exemplary well penetrating through a geologic formation 105 and having a production tubing string 109 disposed within a well casing 101. Liquids, gases or both may fill or be present within an annular space, or annulus 102, between the tubing string 109 and the well casing 101. A cement layer 103 external to the well casing 101 seals the casing 101 within the borehole to provide zonal isolation along the length of the well.

In well abandonment, regulatory approval depends on integrity of the well casing 101 and the cement layer 103 as may be determined by logging operations, which may be inhibited by non-solids in the annulus 102. In addition to such notification and permitting requirements, well operators rely on information from other logging operations for assurance and various geologic assessments through all phases of the well. While shown and described in an abandonment process and with the production tubing string 109 and the well casing 101, some embodiments thus facilitate logging at any time across any annulus of an oil well created by an area between any piping, tubing, casing or logging equipment and surrounding piping, tubing, casing or borehole walls.

Embodiments of the invention enable the production tubing string 109 to remain within the casing 101 during the logging. The logging operation may occur from within the production tubing string 109. Avoiding removal of the production tubing string 109 prior to the logging provides benefits in time and cost savings for such logging operations.

In pumping step 100, an injection device 201 delivers a solidifying fluid 202 through the production tubing string 109. The solidifying fluid 202 being pumped into the well passes into the annulus 102, which may be vented to permit such fluid cycling back upward. The solidifying fluid 202 remains in liquid form throughout the injection process until the annulus 102 is filled as desired, such as at least along a length where the logging is planned, prior to selective solidification.

A displacement fluid, such as drilling mud, used in some embodiments causes the solidifying fluid 202 to exit the production tubing string 109 and not remain in the production tubing string 109 when pumping is stopped upon the solidifying fluid 202 being delivered to the desired location. The solidifying fluid 202 may thus only occupy the annulus 102 at this point of the process prior to selective solidification of the solidifying fluid 202. Even once the solidifying fluid 202 is activated for solidification, the logging operation may thereby still be conveyed through an inner bore of the production tubing string 109.

In some embodiments, the solidifying fluid 202 capable of reversible or selective solidification includes magnetorheological materials, which are of commercial availability for other magnetorheological fluid (MRF) applications such as shock absorbers. The magnetorheological materials include magnetic particles, which may be between 0.1 and 10 microns, suspended in a fluid carrier, such as silicone and hydrocarbon oils. The magnetorheological material exhibits rapid and reversible changes in rheological properties controlled by application of a magnetic field.

The shear stress and viscosity of the magnetorheological materials depend on whether the material is in the presence of the magnetic field, termed the on-state, or in the absence of the magnetic field, termed the off-state. In the on-state, the magnetic particles align with the magnetic field increasing the shear yield stress and viscosity of the magnetorheological material over its off-state value. As used herein, the on-state refers to a solidified state for the solidifying fluid 202 employed during logging, and the off-state refers to a liquefied state of the solidifying fluid 202 utilized for injecting and recovering the solidifying fluid 202 from the well.

In alternative embodiments, a thixotropic fluid may form the solidifying fluid 202. Thixotropic fluids may include gels or colloids, which are thick, or viscous, under static conditions and flow, or become less viscous, due to having been shaken, agitated, or otherwise stressed at times desired for circulation into and out of the well. In other embodiments, the solidifying fluid 202 may include material capable of being polymerized and depolymerized to achieve desired state changes or material forming a solid in the well below its melting temperature and returning to liquid above its melting temperature, as a result of applying heat, cooling or polymerization catalysts downhole.

Figure 2:
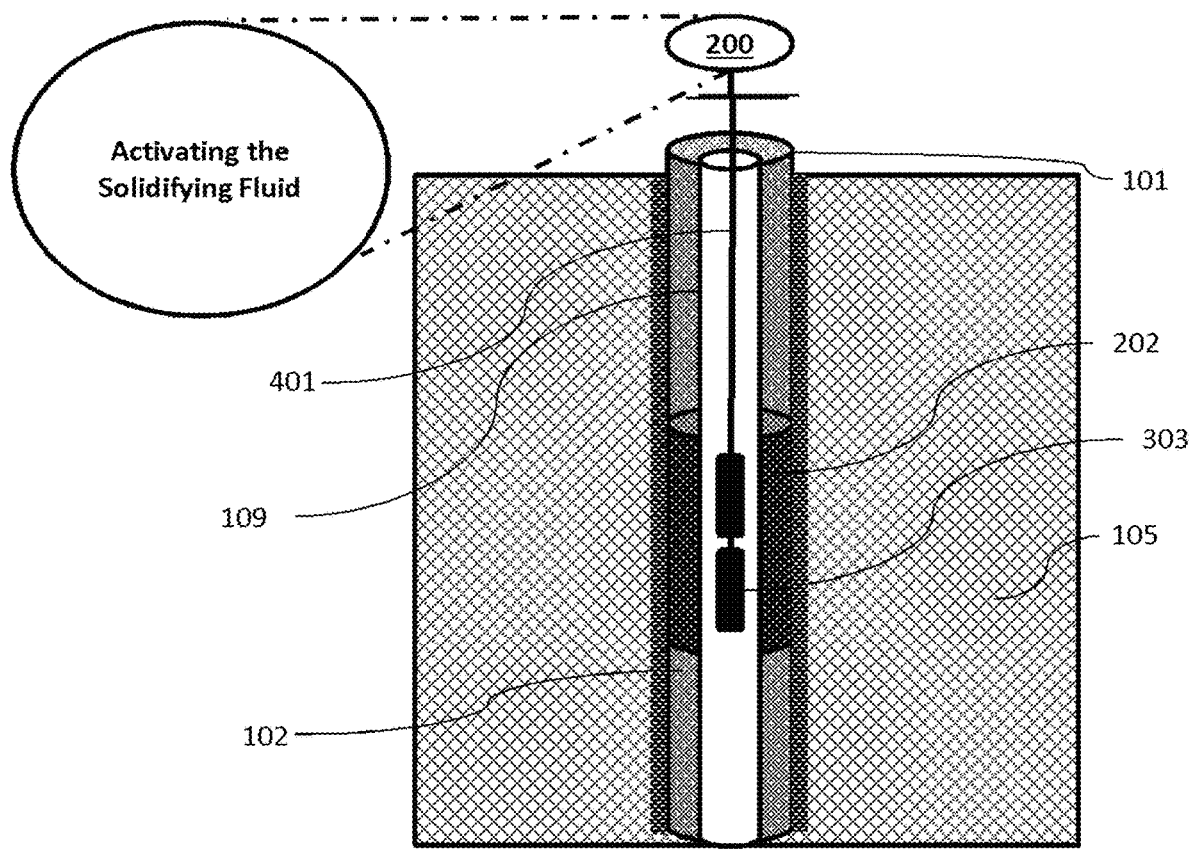
FIG. 2 depicts a cross-sectional schematic of the well having solidified annular material.

FIG. 2 shows a solidification step 200 following the injection of the solidifying fluid 202. The solidification step 200 includes exciting of the solidifying fluid 202 in order to cause the solidifying fluid 202 to harden into the solidified state. In some embodiments, conveying an electromagnet 303 disposed on a wireline 401 run into the well through the production tubing string 109 lowers the electromagnet 303 to a position where desired for the logging. Activation of the electromagnet 303 places in the on-state magnetorheological materials of the solidifying fluid 202 in at least a surrounding area of the electromagnet 303. Once in the on-state, the solidifying fluid 202 provides such longitudinal portion of the annulus 102 filled in the solidified state extending from the production tubing string 109 to the casing 101, thus reducing potential interference when logging across the annulus 102.

Figure 3:
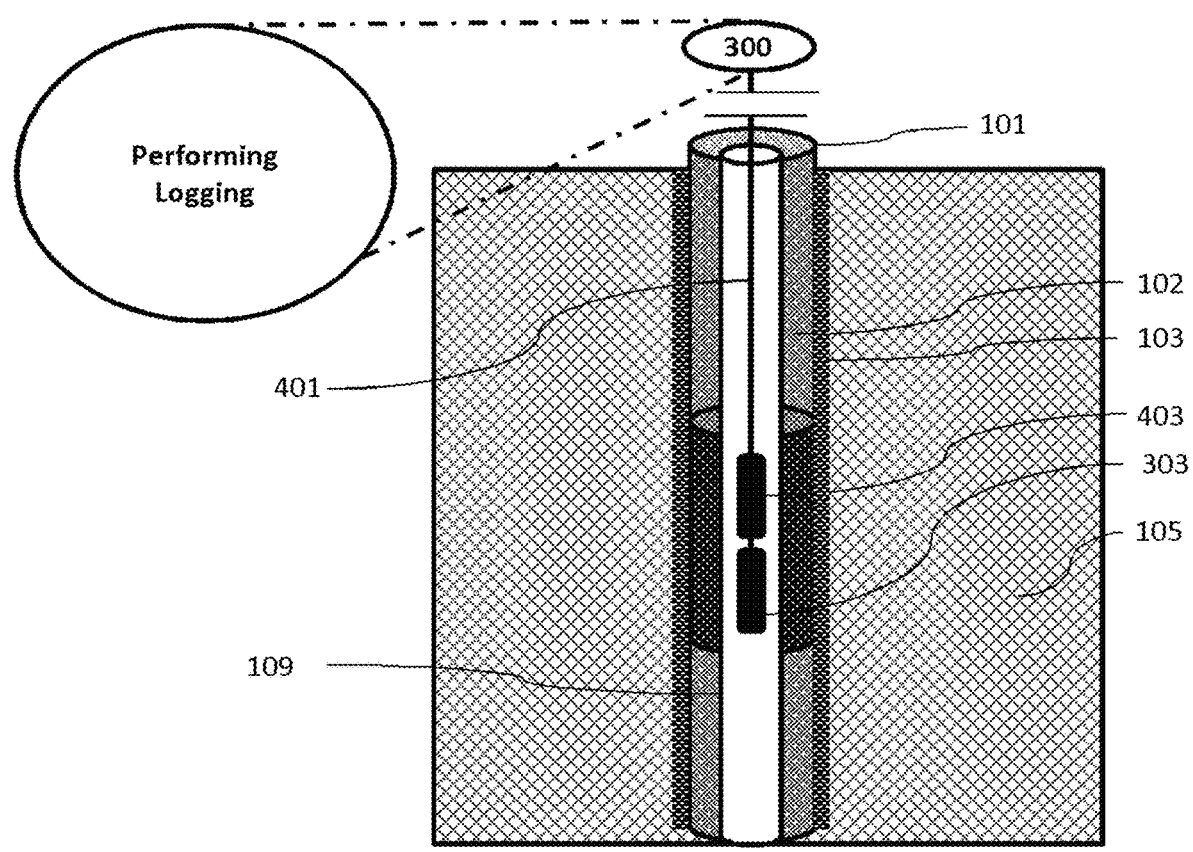
FIG. 3 depicts a cross-sectional schematic of a well-logging apparatus within a production tubing string.

FIG. 3 illustrates a cement evaluation step 300 utilizing a logging tool 403 disposed on the wireline 401 adjacent to the electromagnet 303. Position of the logging tool 403 may coincide with a length of the well where the solidifying fluid 202 is in the solidified state. The annulus 102 surrounding the logging tool 403 thus has the solidifying fluid 202 in the solidified state.

The electromagnet 303 remains activated during operation of the logging tool 403, which may rely on sonic waves, so the solidifying fluid 202 stays in the solidified state to facilitate transmission of the sonic waves. Data collected from the logging tool 403 enables assessing characteristics of the cement layer 103 externally located from the casing 101 in order to ensure zonal isolation of the well. Deactivation of the magnetic field applied by the electromagnet 303 results in the off-state for the magnetorheological materials in the solidifying fluid 202, which is thus returned to the liquefied state for removal of the solidifying fluid 202 located within the casing 101.

Figure 4:
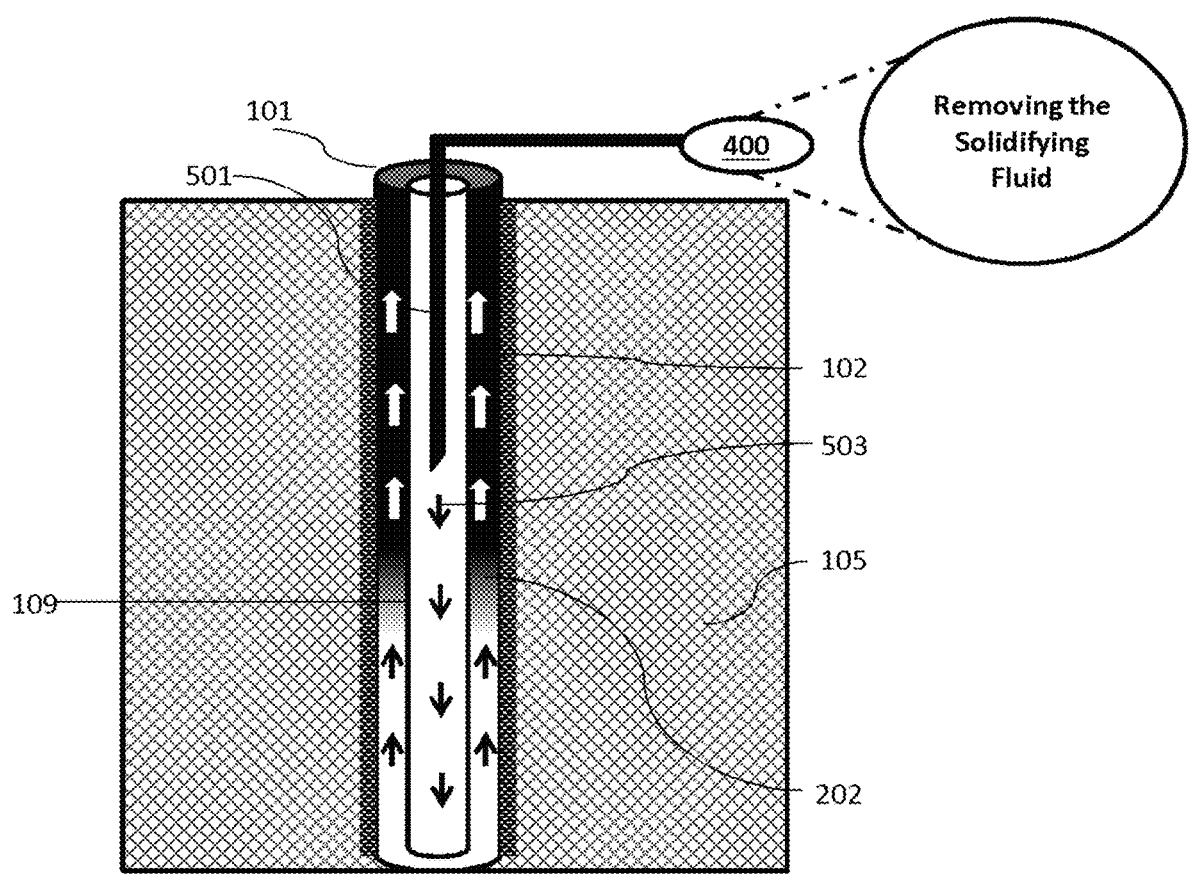
FIG. 4 depicts a cross-sectional schematic of a well annulus having liquid-state annular material, or solidifying fluid, removed from the well annulus.

FIG. 4 shows a solidifying fluid recovery step 400 following completion of the cement evaluation step 300 and return of the solidifying fluid 101 to the liquefied state. The removal of the solidifying fluid 101 may occur using typical displacement of the solidifying fluid 202 out by injecting with a recovery device 501 displacing fluid 503, such as cement or drilling mud, down the production tubing string 109 thus pumping the solidifying fluid 202 up and out of the annulus 102 at the surface. In an alternative embodiment, suction equipment collects the solidifying fluid 202 through the production tubing string 109. Removal of the solidifying fluid 202 allows further well abandonment, completion or additional remedial steps to occur with the annulus 102 reopened for circulation.

Figure 5:
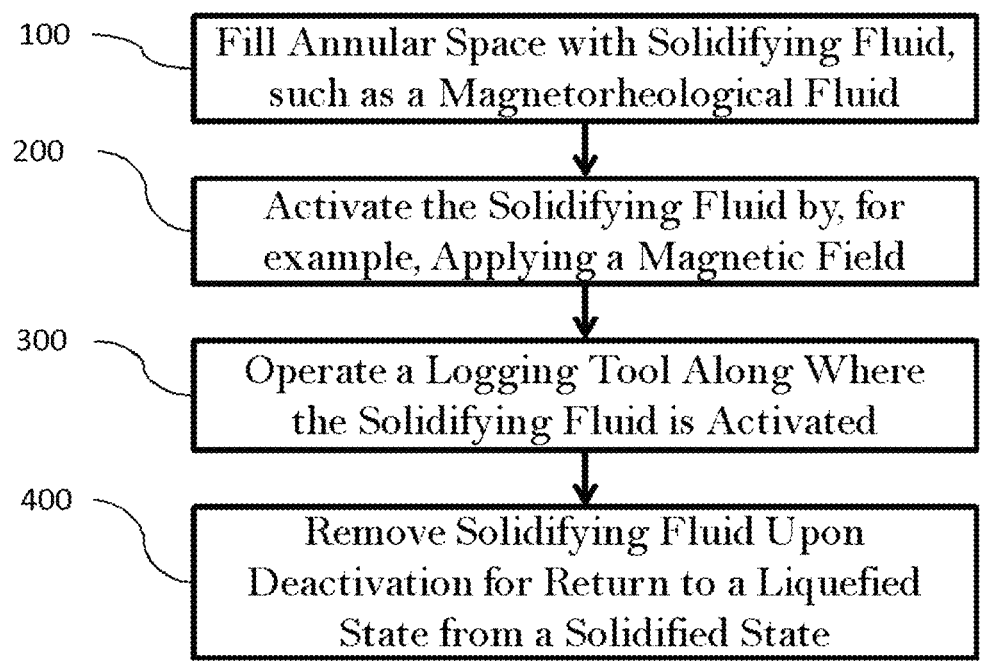
FIG. 5 depicts a flow diagram of a method, according to one embodiment of the invention.

FIG. 5 depicts a flow diagram for the method of logging the well facilitated by use of the solidifying fluid 202, as described with respect to FIG. 1 to FIG. 4. The pumping step 100 fills an annular space with the solidifying fluid 202. Activating the solidifying fluid 202 to a solidified state may include applying a magnetic field via the solidification step 200. Logging performed during cement evaluation step 300 employs typical and customary logging tools capable of assessing cement disposed beyond the annulus filled with the solidifying fluid 202 activated while the logging is performed. Following the logging of one or more various aspects of the well, deactivation of the solidifying fluid 202 back to a liquefied state by removing the magnetic field allows for the solidifying fluid to be recovered from the annulus.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A system for logging a well, comprising:
   a magnetorheological fluid injected into an annulus of the well;
   a logging tool disposed in the well along a length of the annulus filled with the magnetorheological fluid; and
   an electromagnet disposed in the well proximate the logging tool and configured for selective activation of the magnetorheological fluid to a solidified state during operation of the logging tool.

2. The system of claim 1, wherein the magnetorheological fluid includes magnetic particles between 0.1 and 10 microns.

3. The system of claim 1, wherein the magnetorheological fluid includes at least one of silicone and hydrocarbon oil.

4. The system of claim 1, wherein the magnetorheological fluid includes magnetic particles between 0.1 and 10 microns suspended in at least one of silicone and hydrocarbon oil.

5. The system of claim 1, further comprising an injection and recovery device configured to deliver and remove the magnetorheological fluid in a liquefied state from the annulus.

6. The system of claim 1, wherein the logging tool collects data by transmitting waves through the magnetorheological fluid in the solidified.

7. The system of claim 1, wherein the logging tool collects data by transmitting sonic waves through the magnetorheological fluid in the solidified.

8. The system of claim 1, wherein cement is disposed external of casing and the logging tool is configured to collect data for assessing the cement.

9. The system of claim 1, wherein cement is disposed external of casing and the logging tool run into the well through production tubing inside the casing is configured to collect data for assessing the cement.

10. The system of claim 1, wherein cement is external of casing, and the logging tool configured to collect data for assessing the cement is disposed within production tubing with the annulus defined between the casing and the production tubing.

11. A method of logging in a well, comprising:
    injecting a solidifying fluid while in a liquefied state into an annulus of a well;
    operating a logging tool disposed in the well along a length of the annulus filled with the solidifying fluid; and
    activating the solidifying fluid to a solidified state during the operating of the logging tool.

12. The method of claim 11, wherein the solidifying fluid is a magnetorheological fluid.

13. The method of claim 11, wherein the activating includes applying a magnetic field with an electromagnet disposed proximate the logging tool.

14. The method of claim 11, further comprising deactivating the solidifying fluid to the liquefied state and recovering the solidifying fluid from the well.

15. The method of claim 11, wherein the operating of the logging tool includes transmitting waves through the solidifying fluid formed of magnetorheological fluid in the solidified state.

16. The method of claim 11, wherein the logging tool is within a production tubing and collecting data with the logging tool for assessing cement, which is external of casing with the annulus defined between the casing and the production tubing.

17. A method of assessing cement quality surrounding casing of a well, comprising:
    injecting a magnetorheological fluid in a liquefied state into an annulus between production tubing and the casing;
    applying a magnetic field with an electromagnet to activate the magnetorheological fluid in the annulus to a solidified state;
    logging the cement quality by transmitting from a logging tool through the magnetorheological fluid in the solidified to the cement;
    recovering the magnetorheological fluid from the well upon deactivation of the electromagnet to return the magnetorheological fluid to the liquefied.

18. The method of claim 17, further comprising running the electromagnet and logging tool together via wireline through the production tubing.

19. The method of claim 17, wherein the magnetorheological fluid includes magnetic particles between 0.1 and 10 microns suspended in at least one of silicone and hydrocarbon oil.

20. The method of claim 17, wherein the logging tool transmits sonic waves for the logging of the cement quality.

* * * * *